Patented Sept. 17, 1940

2,215,180

UNITED STATES PATENT OFFICE 2,215,180

PRODUCTION OF ESTERS OF DOUBLE UNSATURATED ALCOHOLS

Felix Kaufler, Munich, Germany, assignor to Dr. Alexander Wacker Gesellschaft für Elektrochemische Industrie, G. m. b. H., Munich, Bavaria, Germany, a corporation No Drawing. Application April 23, 1938, Serial No. 203,823. In Germany May 3, 1937

5 Claims. (Cl. 260—494)

This invention relates to the production of esters of double unsaturated alcohols of the aliphatic series and has for its object to provide a new and improved process for this purpose.

It is known that simple unsaturated aldehydes are to a large extent transformed into the corresponding diacetates under the action of acetic anhydrides and sulphuric acid.

It was, therefore, surprising that in reacting acid anhydrides upon unsaturated aldehydes of the aliphatic series in the presence of salts of the corresponding acids, an enolization, hitherto never observed with unsaturated aldehydes, takes place with simultaneous acylation, while the acid esters of the double unsaturated alcohols are generated.

These hitherto unknown esters have properties which are ascribed to their three characterizing groups. Namely, they are on the one hand saponifiable, on the other hand they show the additive capacity which is the property of the simple and in particular the double unsaturated compounds, both with reference to other substances and to themselves. Accordingly, the esters obtained are suitable as initial substances for the production of further chemical transformations.

In carrying out the process according to the invention, for example, a mixture of croton-aldehyde, acetic anhydride, and water-free sodium acetate may be boiled for several hours in a vessel provided with a reflux cooler; pressure being applied if desired. The ester may be readily isolated from the reaction mixture.

Example 1

A mixture of

| | Grams |
|---|---|
| Freshly distilled croton-aldehyde | 120 |
| Acetic anhydride of about 95% strength | 220 |
| Water-free sodium acetate | 100 | is boiled for five hours in a flask provided with a reflux cooler. The reaction product is poured into water and the oil layer which is separated is subjected to vacuum distillation. In addition to the unchanged initial substances there is obtained the 4-hydroxy-1,3-butadiene-acetate as the principal product of the transformation. This is a very strongly light-refractive liquid with a slight ester odor, which boils at a pressure of 30 mm. at 51–52° C.

Example 2

The basis of this example is the same as that of Example 1, but, instead of using sodium acetate, 130 g. of water-free potassium acetate are used. An overpressure of ½ atmosphere is used for accelerating the transformation, whereby the reaction is terminated in four hours. The reaction mixture is distilled quite readily in vacuum. The results are substantially the same as in Example 1.

The invention claimed is:

1. Process for producing esters of double unsaturated alcohols of the aliphatic series, which comprises reacting acetic anhydride upon lower mono unsaturated aliphatic aldehydes in the presence of water-free alkali metal acetate.

2. Process for producing esters of double unsaturated alcohols of the aliphatic series, which comprises reacting acetic anhydride upon lower mono unsaturated aliphatic aldehydes in the presence of a water-free alkali metal acetate.

3. Process for producing esters of double unsaturated alcohols of the aliphatic series, which comprises reacting acetic anhydride upon croton-aldehyde in the presence of water-free alkali metal acetate.

4. Process for producing esters of double unsaturated alcohols of the aliphatic series, which comprises boiling a mixture of croton-aldehyde, acetic anhydride and water-free alkali metal acetate, and separating and distilling the resulting oil layer.

5. 4-hydroxy-1,3-butadiene-acetate having a boiling point of 51–52° C. at 30 mm. pressure.

FELIX KAUFLER.